Oct. 8, 1968 C. GILKER 3,405,318
REPEATING CIRCUIT INTERRUPTER
Filed Sept. 20, 1965 2 Sheets-Sheet 1

INVENTOR.
Clyde Gilker
BY Fred Wivrott
Attorney

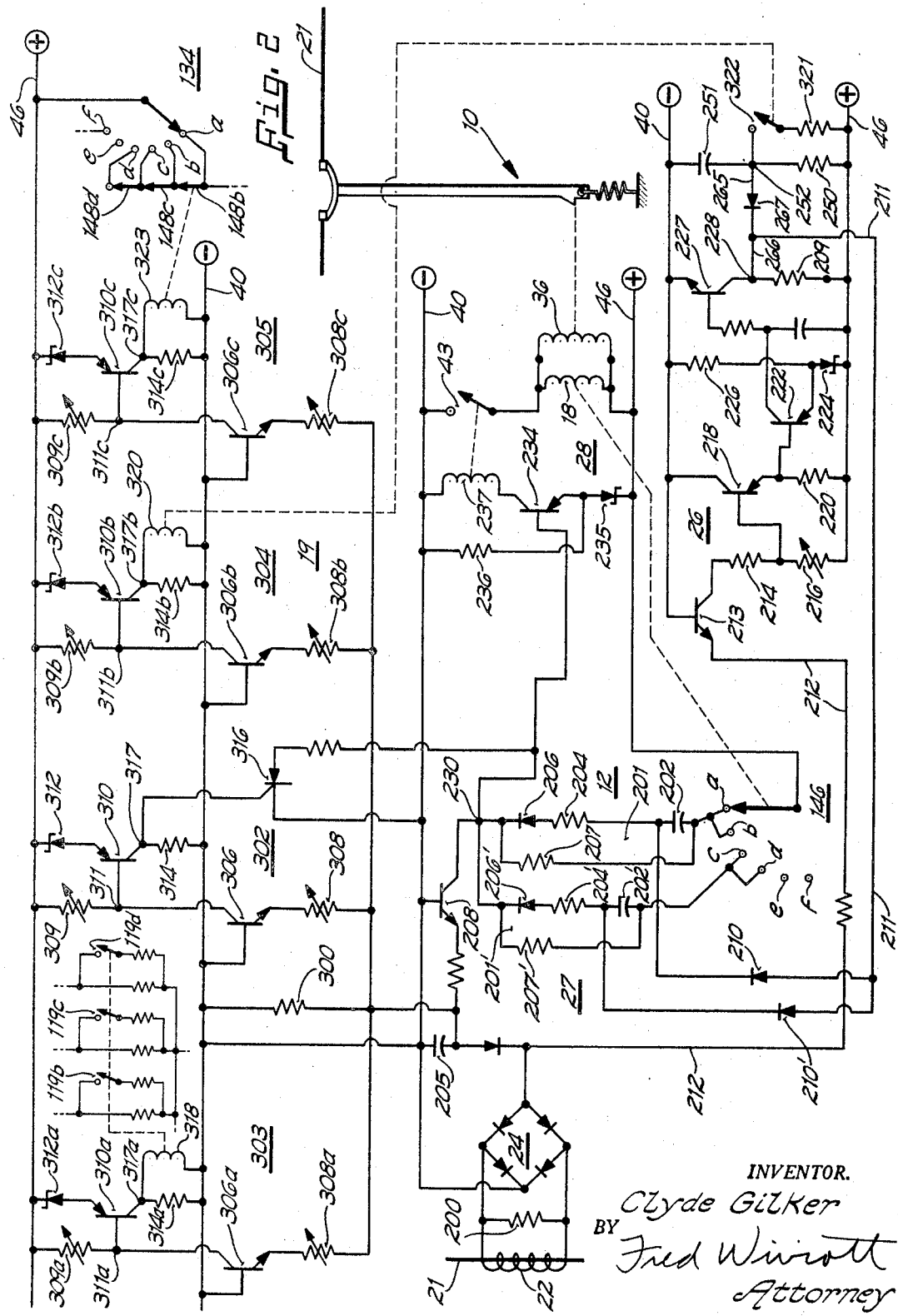

United States Patent Office
3,405,318
Patented Oct. 8, 1968

3,405,318
REPEATING CIRCUIT INTERRUPTER
Clyde Gilker, South Milwaukee, Wis., assignor to McGraw-Edison Company, Milwaukee, Wis., a corporation of Delaware
Filed Sept. 20, 1965, Ser. No. 488,371
29 Claims. (Cl. 317—22)

ABSTRACT OF THE DISCLOSURE

A repeating circuit interrupter in which a main switch is controlled to perform a sequence of opening and closing operations. The switch is opened after an opening time delay in response to the sensing of a relatively low overload condition by a current level detector and closed after a predetermined time delay which is relatively short for at least the first closing operation and longer for subsequent closing operations. If the overload condition continues after a predetermined number of such opening and closing operations, as determined by a sequencing circuit, the switch is locked open. In the event that the switch operates through less than the predetermined number of operations, a reset circuit resets the sequencing circuit to its initial position after a time delay sufficient to prevent inadvertent resetting. An additional current level detector is provided to modify the opening, reclosing and resetting time delays and the number of operations to locked-open condition upon the occurrence of a higher magnitude overload condition.

Background of the invention

This invention relates to repeating circuit interrupters and, more particularly, to means for modifying the operation of a repeating circuit interrupter in response to the occurrence of a predetermined circuit condition.

A repeating circuit interrupter or recloser may be characterized as a circuit protective device having abnormal condition sensing means and connected to the system being protected and responsive to abnormal circuit conditions to initiate a switch opening operation, switch reclosing means operable after each opening operation, opening and reclosing time delay means and sequencing means which is operable to initiate the various functions and to prevent reclosing after a predetermined number of opening operations.

Because the majority of faults in electrical distribution systems are temporary in nature and will clear in a relatively short period of time, it is common to arrange the switch opening means of the repeating circuit interrupter to execute a series of relatively rapid opening operations so that the period during which the system remains energized is shorter than the time for other system protective devices, such as fuses, to operate. In addition, the circuit interrupter contacts should not be closed immediately in order to allow such fuses to cool. If the fault does not clear during this initial series of rapid operations, opening time delay means is actuated by the sequencing means so that there follows a second series of operations in which the recloser contacts remain closed for a period of sufficient length to allow the other system protective devices to operate. If the fault has not cleared after a predetermined number of such time delayed operations, it is considered permanent and the sequencing means prevents the actuation of reclosing means so that the device is locked open. On the other hand, should the fault clear during any of the relatively rapid or time delayed operations, it is necessary for the operation counting means to be reset in its initial position so that upon the occurrence of a subsequent fault, the recloser will execute the full number of rapid and time delayed operations prior to being locked open. Such resetting means is usually time delayed so that premature resetting will not occur to interfere with normal operations.

Upon the occurrence of certain fault conditions in the system being protected, it is sometimes desirable to modify the normal recloser operating sequence. For example, should an abnormally high fault current occur, it may be desirable that the recloser open instantaneously without the usual opening time delay. It may also be desirable, upon the occurrence of relatively large fault currents, to modify the recloser's reclosing time delay. In addition, excessive fault currents may also require that the recloser be locked open after less than the usual number of opening operations so that the apparatus being protected is not damaged during a succession of operations. Further, under certain operating conditions, it may be desirable that the resetting means operate more rapidly than normal.

It is an object of the invention to provide means for altering the operations of a repeating circuit interrupter upon the occurrence of predetermined circuit conditions.

A further object of the invention is to provide means for modifying the opening time delay of a repeating circuit interrupter upon the occurence of a predetermined circuit condition.

Another object of the invention is to provide means for modifying the reclosing time delay of a repeating circuit interrupter upon the occurrence of a predetermined circuit condition.

A further object of the invention is to provide means for modifying the number of operations to lock out of a repeating circuit interrupter upon the occurrence of a predetermined circuit condition.

Still another object of the invention is to provide means for modifying the resetting time delay of a repeating circuit interrupter upon the occurrence of a predetermined circuit condition.

These and other objects and advantages of the instant invention will become more apparent from the detailed description thereof, taken with the accompanying drawings.

Brief description of the drawings

FIG. 2 schematically illustrates, in greater detail, a portion of the repeating circuit interrupter shown in FIG. 1.

Summary of the invention

Figure 1:
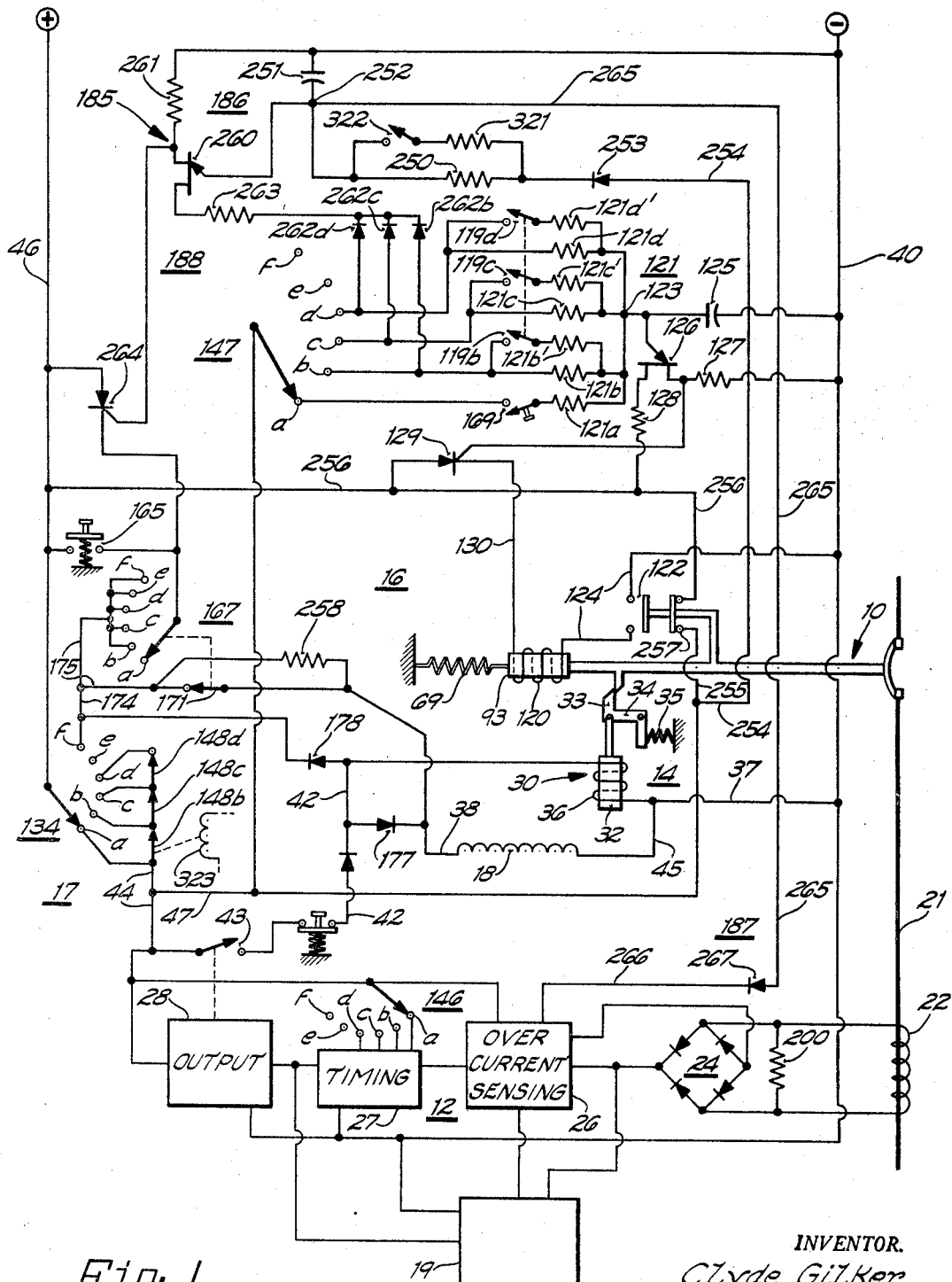
FIG. 1 schematically illustrates a repeating circuit interrupter incorporating the instant invention.

According to one of its aspects, the invention comprises a repeating circuit interrupter having control means for opening main switch means upon the occurrence of a first predetermined overload and for closing the switch means, sequencing means operable to sequence the control means through a predetermined number of switch opening and switch closing operations terminating in a permanently locked open condition, and level detecting means operable upon the occurrence of an overload having a predetremined greater value than the first predetermined overload to effect a permanently locked open condition after a number of switch opening operations that is less than the predetermined number.

According to still another of its aspects, the invention comprises a repeating circuit interrupter having switch operating means including means for opening main switch means upon the occurence of a first predetermined overload current and means for reclosing the switch means after an opening operation thereof, reclosing time delay means operable to delay the switch closing operations, and overload responsive means operable to modify the reclosing time delay upon the occurrence of a second overload current having at least a predetermined greater value than the first predetermined overload current so that the closing time delay of the switch closing means will be modified.

According to a further one of its aspects, the invention comprises a repeating circuit interrupter having control means for opening main switch means upon the occurrence of a first predetermined overload and for reclosing the switch means, sequencing means operable to sequence the control means through a predetermined number of switch opening and switch reclosing operations terminating in a permanently locked open condition, reset means for resetting the sequencing means if the number of switch opening operations is less than a predetermined number, time delay means for delaying the operation of the reset means after a switch closing operation, and overload responsive means responsive to an overload current having a predetermined greater value than the first overload current and operative to modify the time delay means so that the time delay of the reset means has a predetermined different value.

According to yet another one of its aspects, the invention comprises a repeating circuit interrupter having switch operating means including means for opening main switch means upon the occurrence of a first predetermined overload curent and means for reclosing the switch means after an opening operation thereof, operation counting means coupled to the switch operating means and actuable by the operation thereof and time delay means associated with the switch opening means and including timing circuit means for delaying the opening of the main switch means according to an inverse time current characteristic, and overload responsive means operable to render the time delay means inoperative upon the occurrence of a second overload current having at least a predetermined greater value than the first predetermined overload current so that the opening of the switch means will not be time delayed.

*Description of the preferred embodiment*

Referring now to the drawings in greater detail, FIG. 1 shows a repeating circuit interrupter or recloser having a main interrupting switch 10, overload responsive means 12, switch opening means 14, switch closing means 16, sequencing means 17 and operation modifying means 19. In general terms, the overcurrent responsive means 12 is operable to actuate the switch opening means 14 upon the occurrence of an overload in the system being protected so that the interrupting switch 10 will be moved to its open position. Upon this event, the reclosing means 16 is made operable to return the interrupting switch 10 to its closed position. The sequencing means 17, which performs the operation counting and lockout functions, includes, a stepping relay coil 18, and step switches 134, 146, 147 and 167.

For a more complete description of the circuit breaker operating mechanism usable with the illustrated control mechanism, reference is made to copending application Ser. No. 325,215, filed Nov. 21, 1963 and assigned to the assignee of the instant invention.

The overcurrent responsive means 12 is shown coupled to the protected system 21 by a current transformer 22 and a full wave rectifier 24 and includes an overcurrent sensing portion 26, a timing portion 27 and an output portion 28. The overcurrent responsive means 12 will be discussed in greater detail hereinbelow, it being sufficiently at this point to state that when a predetermined overcurrent is sensed by the overcurrent sensing portion 26, a signal is provided to the timing portion 27 which then initiates a timing operation, and, after a predetermined interval, provides a signal to the output portion 28 which initiates an opening operation of the interrupting switch 10 by closing normally open contacts 43.

The switch opening means 14 is shown in FIG. 1 to include an electromagnetic tripper 30 having a plunger 32 and coil 36. The plunger 32 is mechanically coupled to a latch crank 33 which is normally urged in a clockwise direction about pivot point 34 by a reset spring 35 to hold the main switch 10 in its closed position against the influence of an opening spring 69. The coil 36 is connected by a conductor 37 to the negative power supply bus 40 and by a conductor 42 to the contacts 43. A conductor 44 connects the other side of contacts 43 to the positive bus 46 through the step switch 134 which is initially on tap *a*.

As stated hereinabove, the contacts 43 are closed upon the occurrence of an abnormal circuit condition to energize coil 36 which, in turn, rotates the crank 33 counterclockwise to release the main switch 10 for movement toward its open position under the influence of an opening spring 69. After the main switch 10 has opened, the contacts 43 are returned to their normal open position to deenergize coil 36 so that crank 33 may be returned to its initial position by a reset spring 35. The trip portion 14 is thereby reset in a position to relatch the main switch 10 when it is returned to its closed position.

Before continuing with the discussion of the mechanical portion of the device, the operation of the sequencing means 17 will be mentioned briefly. The sequencing means 17 is schematically illustrated to include a stepping relay coil 18 and step switches 134, 146, 147 and 167, although any well-known type of mechanical or static stepping device may be employed. The sequencing means 17 has a plurality of sequentially operable stages, symbolized by the coil 18 and a movable wiper and taps or stages *a–f* for each of the step switches. Each time coil 18 is energized, it is operable to simultaneously advance each wiper one tap from *a* to *f* and back to *a*. While it may appear from the schematically illustrated step switches that the circuit through each will be momentarily opened when their respective wipers are between positions, in actual practice the switches are of the type wherein the wiper bridges over to the next contact before moving off a previous one so that circuit integrity is maintained. For this reason, contacts 171 are provided in the relay 18 energizing circuit and are arranged to open and reclose each time the coil 18 advances the step switches so that coil 18 will be deenergized and drop out in preparation for a succeeding stepping operation.

Because the stepping relay 18 is connected by conductors 37, 38, 42 and 45 in parallel with the coil 36, said coil 18 will be energized when contacts 43 are closed. Thus, each time the recloser executes an opening operation, the coil 18 will advance each of the switches 134, 146, 147 and 167.

The reclosing assembly 16 includes a closing coil 120, time delay circuit 121 and normally open contacts 122, which are mechanically connected to the switch 10. A conductor 124 and contacts 122 connect one side of the closing coil 120 to the negative bus 40 and conductor 130 connects the other side thereof to the time delay circuit 121, which, in turn, is connected to the positive bus 46 by conductor 256 and through switches 147, conductors 47 and 44, and switch 134. When the main switch 10 is in its closed position, contacts 122 are open so that the closing coil 120 and the time delay circuit 121 are deenergized. When the main switch 10 reaches its fully open position, the contacts 122 close to complete an energizing circuit through the time delay circuit 121 which then operates to complete an energizing circuit to the closing coil 120. This moves the magnetic plunger 93 toward the right as seen in FIG. 1, to close the main switch 10 and extend the opening spring 69 thereby storing energy for the succeeding opening operation. In addition, the contacts 122 are opened to deenergize the closing coil 120 and the time delay circuit 121.

FIG. 2 shows the details of the overcurrent sensing portion 26, the timing portion 27 and the output portion 28 of the overload responsive means 12. The circuit 12 is coupled to the system 21 by a current transformer 22, a resistor 200, and the full wave rectifier 24 whose output terminals are connected across a capacitor 205. As a result, a volatge will appear across capacitor 205 which is proportional to the current flowing and the system 21.

The timing portion 27 of circuit 12 includes a first timing circuit 201 connected to taps $a$ and $b$ of switch 146 and a second timing circuit 201' connected to taps $c$ and $d$ of said switch. The timing circuits 201 and 201' are identical except for the size of their components, which determine their time delay characteristics, and, accordingly, only timing circuit 201 will be discussed in detail for the sake of brevity. Circuit 201 is shown to include a timing capacitor 202 connected in series with a timing resistor 204 and a diode 206 and the series combination connected in parallel with a second timing resistor 207. As more fully described in copending application Ser. No. 800,567, filed Mar. 19, 1959 and assigned to the assignee of the instant invention, the impedance values of capacitor 202 and resistors 204 and 207 determine the charging time for any given fault current. Under normal operating conditions, the tap switch 146 will be initially connected to tap $a$, so that timing circuit 201 will be operable during the first opening operation.

In operation, the current flow to the collector of the charging transistor 208, which is a function of the voltage across capacitor 205, will split between the parallel path defined by the timing resistor 207 and the series combination of timing resistor 204 and timing capacitor 202. When there is no fault in the system 21, capacitor 202 is prevented from charging because it is shunted by a leakage resistor 209 located in the overcurrent sensing portion 26 and to which it is connected by diode 210 and conductor 211. As a result of this leakage current, the terminal 228 of resistor 209 has some positive potential.

The current flowing to the overcurrent sensing portion 26 through conductor 212 is also proportional to the peak current in the system 21 and results in proportional transistor 213 collector current flowing through resistors 214 and 216. This produces a potential on the base of transistor 218 which is also proportional to said peak current. Transistor 218 draws emitter current proportional to this potential through a resistor 220 so that its emitter potential is also proportional to said peak current. The emitter of a transistor 222 is held at a fixed potential by a Zener diode 224 and a resistor 226 while its base is connected to the emitter of transistor 218. Thus by a proper selection of components transistor 222 can be considered as a level detector which is rendered conductive when the current and the system 21 equals or exceeds the desired minimum actuating current of the device.

Upon the occurrence of an overcurrent in the system, transistor 222 becomes conductive, passing current to the base of an output transistor 227. Upon the latter event, transistor 227 will become conductive and connect the leakage resistor 209 to the negative bus 40. This, in turn, causes terminal 228 to assume a negative potential so that leakage current can no longer flow from capacitor 202. As a result, timing capacitor 202 is prevented from discharging through leakage resistor 209 and, therefore, begins charging. In this manner, the timing operation is initiated. Diode 210 performs the function of preventing reverse current flow from junction 228 to charging capacitor 202.

The output portion 28 of the overcurrent sensing means 12 includes a level detecting transistor 234 whose base is connected to junction 230 while its emitter is held a constant potential by a Zener diode 235 and a resistor 236 connected across the power supply buses 40 and 46. The emitter of transistor 234 is connected to relay coil 237 which operates contacts 43.

After timing capacitor 202 has charged for a predetermined time, which is the time delay for the first operation of the device, the potential at junction 230 will reach the point where transistor 234 is rendered conductive. The relay 237 will thus be energized to close contacts 43 and thereby initiate an opening operation of the main switch 10 in the manner described hereinabove. In addition, stepping relay 18 will also be energized so that step switch 146 will be moved to tap $b$, whereby the time delay circuit 201 will also be effective during the second switch opening operation. Should the fault persist, requiring a third and a fourth opening operation, the switch 147 will be moved to taps $c$ and $d$ so that the time delay circuit 201' will be effective whereby the third and fourth operations may have a longer time delay than the initial operations.

The reclosing time delay circuit is shown in FIG. 1 to include three resistors 121$b$, 121$c$ and 121$d$, each having one terminal connected to corresponding taps $b$, $c$ and $d$ of switch 147 and their other terminals connected to a common point 123. In addition, the time delay circuit 121 includes a capacitor 125 connected between point 123 and the negative bus 40. The emitter electrode of a unijunction transistor 126 is connected to point 123 while its base-one electrode is connected to the negative bus 40 through a first resistor 127 and its base-two electrode is connected to the positive bus 46 through a second resistor 128 and conductor 256. The gate electrode of a silicon controlled rectifier 129 is connected to the base-one electrode of unijunction 126 and its anode and cathode electrodes are connected between closing coil 120 and positive bus 46 by conductors 130 and 256.

It will be recalled that upon the initial operation of the repeating circuit interrupter, each of the switches 134, 146 and 147 will be on tap $a$ so that contacts 43 will be closed after a relatively short time delay when a fault is sensed by the overcurrent sensing portion 26. This energizes trip coil 36 which opens the main switch 10 and also energizes the stepping relay 18 which moves the switches 134, 146 and 147 to their $b$ taps. The movement of switch 147 to its $b$ tap completes an energizing circuit to the capacitor 125 through resistor 121$b$ so that after a time delay determined by the relative sizes of resistor 121$b$ and capacitor 125, point 123 will reach the breakover potential of unijunction transistor 126. This will cause current to flow through the emitter base-one circuit of unijunction transistor 126 to provide a gate signal to controlled rectifier 129 which then becomes conductive to energize closing coil 120 through conductors 256, 130 and 124 and contacts 122 which are closed when the main switch 10 is open.

Should the fault persist, the output portion 28 will again be energized after a short time delay to close the contacts 43. This will again energize trip coil 36 and stepping relay 18 so that switches 134, 146 and 147 will each be moved to their taps $c$ whereupon capacitor 125 will be charged through resistor 121$c$ so that controlled rectifier 129 will again become conductive thereby energizing closing coil 120 to initiate a second closing operation. Similarly, should the fault persist after the second reclosing operation, trip coil 36 will be energized after a relatively long time delay to again open the main switch 10. In a like manner, after the third opening operation, stepping relay 18 will move each of the switches 134, 146 and 147 to their $d$ taps whereupon closing coil 120 will be energized as a result of the charging of capacitor 125 through resistor 121$d$. If the fault continues after the third closing operation, switch 43 will again be closed to energize the coil 36 and the stepping relay 18 will then move each of the switches to their $e$ taps.

It can be seen that because tap $e$ of switch 134 is open-circuited, closing coil 120 remains deenergized even though contacts 122 are closed when the main switch 10 is open. As a result, the main switch 10 will not reclose. In this manner, the recloser is locked in open position after a predetermined number of opening and closing operations. Resetting of the recloser after it has been locked open in the manner described above, is accomplished by means of a manual reset button 165 and stepping switch 167. It will be remembered that after lockout each of the step switches 134, 146 and 147 as well as 167 will be connected to taps e. When the reset button 165 is closed, the stepping coil 18 will be energized from the positive bus 46 to the negative bus 40 through a path defined by tap e of switch 167, conductor 175, switch 171 and conductors 38, 45 and 37. Stepping relay 18 then moves each of the switches to their position f whereupon an energizing circuit to stepping coil 18 is completed through the tap f of switch 134, conductors 174, 175, switch 171 and conductors 38, 45 and 37. The stepping relay 18 then moves each of the switches to their a taps, whereupon they are in position for a switch closing operation. Diodes 177 and 178, between stepping relay 18 and trip coil 36, prevent energization of the latter during the resetting operation just described.

After the step switches have been cycled to their a taps by reset button 165, the main switch 10 may be reclosed by closing switch 169 which completes a charging circuit to capacitor 125 through resistor 121a and to thereby initiate a switch closing operation as previously described.

It will be recalled that the recloser will cycle itself to lockout only if the fault current persists for a predetermined number of opening and closing operations. In order to reset the device should the fault clear after a lesser number of opening and reclosing operations, a resetting circuit 185 is provided, and includes a timing circuit 186 and a switching circuit 188.

The timing circuit 186 includes a resistor 250 and a capacitor 251 which have a common terminal 252. The other side of resistor 250 is connected to the positive bus by a diode 253, conductors 254, 47 and 44 and contacts 134, while the other side of capacitor 251 is connected to the negative bus 40.

The switching circuit 188 includes a unijunction transistor 260 having its base-one electrode connected to the negative bus 40 through resistor 261 and its base-two electrode connected to taps, b, c and d of step switch 147 through resistor 263 and diodes 262b, 262c and 262d, respectively. As a result, the base-one and base-two electrodes of unijunction 260 will be in circuit between the positive bus 46 and the negative bus 40 only when switch 47 is on taps b, c and d. The switching circuit 188 also includes a silicon controlled rectifier 264 whose gate electrode is connected to the junction between resistor 261 and the base-one electrode of unijunction transistor 260. The anode and cathode of the controlled rectifier 264 are respectively connected to the positive bus 46 and the wiper of step switch 167.

The common terminal 252 between resistor 250 and capacitor 251 is connected by conductors 265 and 266 and diode 267 to the terminal 228 between the collector of transistor 227 and the resistor 209 in the overcurrent sensing portion 26 of the overload responsive means 12 (see FIG. 2).

It will be recalled that when there is no overcurrent in the system 21 being protected, terminal 228 will have some positive potential as the result of the voltage drop across resistor 209. Accordingly, junction point 252 between resistor 250 and capacitor 251 will be isolated from terminal 228 by a blocking diode 268 but will also have a positive potential as a result of its being connected to the positive bus 46 by conductors 254, 255 and 256 and contacts 257 so that charge may accumulate on capacitor 251. It will be further recalled that when a fault appears in the system, transistor 227 will become conductive, thereby connecting terminal 228 to the negative bus 40. As a result, the capacitor 251 is short-circuited. It can thus be seen, that charge may accumulate on capacitor 251 only during normal circuit conditions.

It will be recalled also, that after the first opening operation, switches 134, 146, 147 and 167 will each be advanced from tap a to tap b. Should an overcurrent appear in the system 21 upon reclosure of the main switch 10, capacitor 251 will be short-circuited in the manner discussed above and no charge can accumulate. As a result, unijunction transistor 260 remains inactive and the opening and reclosing operations will continue until lockout or until the abnormal circuit condition disappears.

Assume, on the other hand, that a fault occurs in the system 21 and that after two opening and two reclosing operations, the abnormal circuit condition disappears. It will be appreciated that each of the switches 134, 146, 147 and 167 will be on their c taps and that when the main switch 10 closes, normal circuit conditions will prevail so that transistor 227 becomes nonconductive. Upon this event, terminal 228 of resistor 209 will be disconnected from the negative bus 40 and will assume a positive potential so that it is isolated by diode 267 from junction 252. As a result capacitor 251 begins charging from the positive bus 46 through resistor 250, diode 253, conductors 254, 255, 256 and contacts 257. After a time delay determined by the relative sizes of resistor 250 and capacitor 251, the firing potential of unijunction transistor 260 will be reached and it will conduct emitter current through resistor 261. This provides gate current to the controlled rectifier 264 which will become conductive thereby energizing the stepping relay 18 through a path which includes the positive bus 46, the wiper and tap c of switch 167, switch 171, and conductors 175, 38, 45 and 37. Diode 177 prevents the energization of trip coil 36.

A resistor 258 is provided in shunt with contacts 171 which open each time stepping relay 18 operates, whereby the controlled rectifier 264 will not be open-circuited as the tap switches are operated from taps c to taps d. As a result, relay coil 18 will be immediately reenergized when contacts 171 close to move each of the step switches from their taps c to taps d and so on successively until they return to their taps a. The resistor 258 will, of course, be sufficiently great to insure that relay coil 18 will drop out whenever contacts 171 open.

It can be seen that when the step switch 147 is on its a tap, the base-two electrode of unijunction 260 is open-circuited so that it cannot provide gate current to the controlled rectifier 264. Similarly, when the recloser is in its lockout position, charge cannot be accumulated on capacitor 251 because contacts 257 will be open when the main switch 10 is open. Thus, the resetting circuit 26 will recycle the recloser control to its initial position only when the main contacts are closed, when the overcurrent sensing circuit 26 senses normal conditions, and when the step switches are in any position other than their initial or home positions or their lockout positions.

Turning now to the operations modifying circuit 19, it is shown in FIG. 2 to include a resistor 300 connected across the capacitor 205 so that the voltage drop across it will be proportional to the current flowing in the system 21. In addition, the circuit 19 also includes an opening time delay modifying circuit 302, a reclosing time delay modifying circuit 303, a reset time delay modifying circuit 304 and an operations to lockout modifying circuit 305. The opening time delay modifying circuit 302 includes a level detector symbolized by an NPN type transistor 306 whose base is connected to the positive terminal of resistor 300 and whose emitter is connected to the negative terminal thereof through adjustable resistor 308. In addition, the collector of transistor 306 is connected to the positive bus 46 through adjustable resistor 309.

The opening time delay modifying circuit 302 also includes a switching device symbolized by a PNP type transistor 310 whose base is connected to the junction 311 between the collector of transistor 306 and resistor 309. In addition, the emitter of transistor 310 is connected to the positive bus 46 through Zener diode 312 and its collector is connected to negative bus 40 through resistor 314. The circuit 302 further includes a silicon controlled rectifier 316 whose gate electrode is connected to the junction 317 between the collector of transistor 310 and resistor 314 and whose anode and cathode electrodes are respectively connected to the junction 230 and the negative bus 40.

It will be recalled that under normal operating conditions, the appearance of a fault in the system 21 will result in the accumulation of charge on timing capacitor 202 so that after a time delay the potential at junction point 230 will become more negative than the emitter of transistor 234 so that transistor 234 will become conductive and result in a switch opening operation as previously discussed. It will also be recalled that a voltage drop will appear across resistor 300 which is proportional to the current flowing in the system 21.

Resistors 308 and 309 are so adjusted that when the fault current in the system 21 is less than a predetermined value, transistor 306 conducts at a level that is insufficient to turn on transistor 310. However, should the fault current exceed this predetermined value, the base of transistor 306 will become less negative than its emitter so that transistor 306 will become more conductive. As a result, of the higher current flowing in resistor 309, the base of transistor 310 will become less positive than its emitter and transistor 310 will also become highly conductive. The resulting drop across resistor 314 will provide a gate signal to silicon controlled rectifier 316 causing the latter to become conductive to connect the base of transistor 234 to the negative bus 40 so that transistor 234 becomes highly conductive regardless of the state of charge on capacitor 202. As a result, a recloser opening operation occurs substantially instantaneously and without the normal time delay period provided by the time delay circuits 201 or 201'.

Many of the components of the reclosing time delay modifying circuit 303 are the same as those in the opening time delay modifying circuit 302 and, accordingly, these similar components have been given the same reference numerals which are distinguished by means of the letter a. Resistors 308a, 309a are so adjusted that when less than a predetermined fault current flows in the system 21, level detecting transistor 306a conducts at a level that is insufficient to turn on switching transistor 310a. Upon the occurrence of a fault current which is greater than a predetermined value, however, transistor 306a will become sufficiently conductive to turn on transistor 310a which then conducts current through relay coil 318. This closes contacts 119b, 119c and 119d to place resistors 121b', 121c' and 121d' in parallel with resistors 121b, 121c and 121d, respectively.

It will be recalled that the reclosing time delay circuit 121 will be rendered operative to reclose the main switch 10 a predetermined time after the wiper of step switch 147 has moved to one of the taps b, c and d. This reclosing time for each reclosing operation is governed by the time constant of the RC circuit consisting of capacitor 125 and the resistance between junction point 123 and the respective one of the taps b, c and d of switch 147. It will be appreciated that when the switches 119b, 119c and 119d are closed to connect the resistances 121b', 121c' and 121d' in parallel with resistors 121b, 121c and 121d, respectively, the series resistance between each of the taps b, c and d of the switch 147 and junction point 123 will decrease so that the time delay of each resetting operation will also decrease. Since the opening time delay occurs only after normal conditions return to the system 21, relay 318 must be of the latching type so that contacts 119b, 119c and 119d will remain closed once relay coil 318 has been energized and until opened by operation of the stepping relay 18 returning to its initial or home position.

Similarly, many of the components of the reset time delay modifying circuit 304 are the same as those in the opening time delay modifying circuit 302 and, accordingly, these similar components have also been given the same reference numerals which are distinguished by means of the letter b. Resistors 308b and 309b are so adjusted that when less than a predetermined fault current flows in the system 21, transistor 306b will conduct at an insufficient level to turn on transistor 311b. Upon the occurrence of a fault current which is greater than a predetermined value, however, level detecting transistor 306b will become more conductive which, in turn, causes switching transistor 310b to become conductive and pass current through a relay coil 320. This closes contacts 322 to place a resistor 321 in parallel with the resistor 250 of the resetting time delay circuit 186.

It will be recalled that the resetting time delay circuit 185 will be rendered operative to reset the stepping relay 18 a predetermined time after normal conditions return to the system 21 if the switch 147 is in positions b, c and d. This resetting time delay is governed by the time required for a predetermined amount of charge to accumulate on capacitor 251 charging through resistor 250. By placing resistor 321 in parallel with resistor 250, the charging time for capacitor 251 is reduced so that the resetting time delay is also reduced.

Since the resetting time delay occurs only after normal conditions return to the system 21, relay 320 is of the latching type so that contacts 322 will remain closed once relay coil 320 has been energized and until opened by operation of the stepping relay 18 returning to its initial or home position.

It will also be appreciated that if it were desired to increase the resetting time delay, this could be accomplished by providing that the reset time delay circuit connect a resistor in series with a resistor 250 to thereby increase the total resistance in series with the capacitor 251.

It can be seen with reference to FIG. 1 that many of the components of the operations to lock out modifying circuit 305 are also similar to the components of the opening time delay modifying circuit 302 and, accordingly, these components have also been given the same lower case reference numeral but are distinguished by the letter c. Thus, depending upon the setting of adjustable resistances resistors 308c and 309c the conduction of level detecting transistor 306c will be sufficient to turn on switching transistor 310c when the fault in the system 21 reaches a predetermined value. When transistor 310c is turned on, relay 323 will be energized to open a preset one of the contacts 148b, 148c and 148d. Resistors 308c and 309c will normally be set so that the circuit 305 will be rendered operative when the system current has a predetermined greater value than the minimum overcurrent required to initiate a switch 10 opening operation.

It will be recalled with reference to FIG. 1 that switches 148b, 148c and 148d are disposed between taps a and b, b and c, and c and d of switch 134 which, in turn, is disposed between the positive bus 46 and conductor 47 connected to the wiper of switch 147. It will thus be appreciated that energy for the closing time delay circuit 121 flows through switch 134. When all of the contacts 148b, 148c and 148d are closed, energy will be provided to the closing time delay circuit 121 after each of the first three opening operations as the wiper of step switch 134 is successively moved to taps b, c and d. After the fourth opening operation, however, the wiper of switch 134 will be moved to tap e so that energy will no longer flow to the closing time delay circuit and the device will be prevented from closing until resetting has occurred.

By opening one of the switches 148b, 148c and 148d, the number of operations to lock out can be modified. For example, assume that a fault current occurs in the system which is sufficiently in excess of the minimum overcurrent required for a switch 10 opening operation that circuit 305 will also operate and that relay 323 is connected to open contact 148b. This fault current will, therefore, cause the operation of the opening solenoid 36 which opens the main switch 10. In addition, the stepping relay 18 will also be operated to move the wiper of switch 134 from tap a to tap b. Simultaneously, this fault current will cause relay 323 to open contacts 148b. As a result, the closing time delay circuit 121 will be open-circuited and the recloser will be locked in open position and will remain in its locked open position until reset.

It will also be appreciated that by connecting relay 323 to contacts 148c or 148d, the device can be locked open after two or three opening operations upon the occurrence of a predetermined fault current.

While the invention has been discussed with respect to one particular repeating circuit interrupter control circuit, those skilled in the art will appreciate that it has application to other repeating circuit interrupter control circuits as well. In addition, while the invention has been discussed with respect to the modification of certain ones of the repeating circuit interrupter functions, it will also be appreciated that it can be used to modify other functions as well. Accordingly, while only a single embodiment of the invention has been shown and described, it is not intended to be limited thereby, but only by the scope of the appended claims.

I claim:

1. A repeating circuit interrupter including main switch means in circuit with an electrical system, switch opening means operable to open said main switch means, first level detecting means coupled to said system for actuating said switch opening means when the current in said system equals at least a first predetermined value, switch closing means, sequencing means having a plurality of stages and being operable to a successive one of said stages upon each switch opening operation, the operation of said sequencing means from an initial stage through a predetermined number of stages and to a final stage being effective to prevent the closure of said switch means, normally inactive selective means operatively associated with said sequencing means for disabling said switch closing means to effect a permanently open condition when said sequencing means is in an intermediate one of said stages and second level detecting means coupled to said system and operable upon the occurrence of a current therein having a predetermined greater value than said first predetermined current to render said selective means active.

2. The circuit interrupter set forth in claim 1 and including resetting means coupled to said system and responsive to normal circuit conditions to effect the return of said sequencing means to the first of said successive stages if the number of opening operations is less than a predetermined number.

3. The circuit interrupter set forth in claim 2 and including time delay means for delaying the operation of said resetting means and third level detecting means coupled to said system and operable to modify said time delay means upon the occurrence of a current therein having a predetermined greater value than said first predetermined current.

4. A repeating circuit interrupter including main switch means in circuit with an electrical system, circuit means coupled to said system for providing an electrical signal functionally related to the magnitude of the current in said system, switch opening means operable to open said main switch means, first level detecting means coupled to said circuit means for actuating said switch opening means when said electrical signal equals a first predetermined value, switch closing means, sequencing means having a plurality of stages and being operable to a successive one of said stages upon each switch opening operation, the operation of said sequencing means from an initial stage to each of a predetermined number of said succesive stages being operable to actuate said switch closing means, the operation of said sequencing means to the next succeeding stage after said predetermined number being ineffective to actuate said switch closing means so that said switch means is not reclosed, and second level detecting means coupled to said circuit means and operable upon the occurrence of an electrical signal having a predetermined greater value than said first predetermined electrical signal to render said switch closing means ineffective upon the operation of said sequencing means to one of said predetermined successive stages which is prior to said final stage.

5. The device set forth in claim 1 wherein the operation of the sequencing means from an initial stage to each of a predetermined number of the successive stages is operable to complete an energizing circuit to said switch closing means and including a plurality of circuit means each of which is associated with at least certain of said stages and operable when actuated and when the sequencing means is in the stage associated therewith to open circuit said switch closing means.

6. The circuit interrupter set forth in claim 5 and including resetting means coupled to said system and responsive to normal circuit condition to effect the return of said sequencing means to the first of said successive stages if the number of opening operations is less than a predetermined number.

7. The circuit interrupter set forth in claim 6 and including time delay means for delaying the operation of said resetting means and third level detecting means coupled to said circiut means and operable to modify said time delay means upon the occurrence of an electrical signal having a predetermined greater magnitude than that of said first predetermined signal.

8. A repeating circuit interrupter including switch means in circuit with an electrical system, control means including switch opening means for opening said switch means and first overload responsive means coupled to said system for actuating said switch opening means upon the occurrence of a first predetermined overload in said system and switch closing means for closing said switch means, sequencing means operable to sequence said control means through a predetermined number of switch opening and switch reclosing operations terminating in a permanently locked open condition, resetting means coupled to said sequencing means for resetting the same if the number of switch opening operations is less than a predetermined number, time delay means associated with said resetting means for delaying the operation thereof after a switch closing operation, and second overload responsive means coupled to said system and responsive to an overload current having a predetermined greater value than said first overload current and operative to modify said time delay means so that the time delay of said resetting means has a predetermined different value.

9. The repeating circuit interrupter set forth in claim 8 wherein said sequencing means having a plurality of stages and being operable to a successive one of said stages upon each switch opening operation, the operation of said sequencing means from an initial stage to each of a predeterimned number of said successive stages is operative to actuate said switch closing means, the operation of said sequencing means to the next succeeding stage after said predetermined number being ineffective to actuate said switch closing means so that said switch means is not reclosed, said resetting means being coupled to said system and being operable upon the return of normal circuit conditions to effect the return of said sequencing means to the first of said successive stages if the number of opening operations is less than a predetermined number, said time delay means being operative to delay the operation of said resetting means after the return of normal conditions to said system, and wherein said overload resopnsive means is coupled to said system and is responsive to an overload current having a predetermined greater value than said first overload current to modify said time delay means.

10. The repeating circuit interrupter set forth in claim 9 and including first level detecting means coupled to said system for actuating said switch opening means when the current in said system exceeds a first predetermined value, and wherein said overload responsive means comprises second level detecting means coupled to said system and responsive to a current therein having a predetermined greater value than said first predetermined value and operative to modify said resetting time delay means.

11. A repeating circuit interrupter having switch means for interrupting an electrical circuit, switch operating means including means for opening said switch means and first overload responsive means coupled to said circuit for actuating said switch opening means upon the occurrence of a first predetermined overload current and means for reclosing said switch means after an opening operation thereof, operation counting means coupled to said switch operating means and actuable by the operation thereof and time delay means associated with said switch opening means and including timing circuit means coupled to said electrical circuit for delaying the opening of said main switch means according to an inverse time current characteristic, and second overload responsive means coupled to said circuit and to said timing circuit means and operable to render said time delay means inoperative to delay the operation of said switch opening means upon the occurrence of a second overload current having at least a predetermined greater value than said first predetermined overload current so that the opening of said switch means will not be time delayed.

12. A repeating circuit interrupter including main switch means in circuit with an electrical system, circuit means coupled to said system for providing an electrical signal functionally related to the magnitude of the current in said system, switch opening means operable to open said switch means, first level detecting means coupled to said circuit means for actuating said switch opening means when said electrical signal equals a first predetermined value, time delay means associated with said switch opening means and including timing circuit means coupled to said electrical circuit for delaying the opening of said main switch means according to an inverse time current characteristic, and second level detecting means coupled to said circuit and to said timing circuit means and operable to render said time delay means ineffective to delay the operation of said switch opening means upon the occurrence of an electrical signal having a predetermined greater value than said first predetermined electrical signal.

13. The repeating circuit interrupter set forth in claim 12 and including switch closing means, and sequencing means having a plurality of stages and being operable to successive ones of said stages upon each switch opening operation, the operation of said sequencing means from an initial stage to each of a predetermined number of successive stages being operable to actuate said switch closing means, the operation of said sequencing means to the next succeeding stage after said predeterimned number being ineffective to actuate said switch closing means so that said switch means is not reclosed, and third level detecting means coupled to said circuit means and operable upon the occurrence of an electrical signal having a predetermined greater value than said first predetermined electrical signal to render said switch closing means ineffective upon the operation of said sequencing means to a predeterimned one of said successive stages.

14. The repeating circuit interrupter set forth in claim 13 and including resetting means coupled to said system and responsive to normal circuit conditions to effect the return of said sequencing means to the first of said successive stages if the number of opening operations is less than a predetermined number, time delay means associated with said resetting means for delaying the operation thereof after the return of normal circuit conditions to said circuit, and fourth level detecting means coupled to said circuit means and responsive to an electrical signal having a predetermined greater value than said first predetermined electrical signal and operative to modify said resetting time delay means so that the time delay of said resetting means has a predetermined different value.

15. The repeating circuit interrupter set forth in claim 14 wherein said timing circuit means comprises an RC circuit coupled to said sequencing means, and wherein said sequencing means is operative to modify the time constant of said RC circuit upon the operation from one of its stages to a succeeding stage thereof and wherein said second level detecting means is operative to short circuit said RC circuit.

16. The repeating circuit interrupter set forth in claim 15 and including first means coupled to said switch opening means to said sequencing means and operable when said sequencing means advances from an initial stage to each of a predetermined number of successive stages to actuate said switch closing means, said first means being inoperable to actuate said switch means upon the operation of said sequencing means to the next succeeding stage after said predetermined number, so that said switch means is not reclosed.

17. A repeating circuit interrupter having switch means for interrupting an electrical system, switch operating means including means for opening said switch means and first overload responsive means coupled to said system for actuating said switch opening means upon the occurrence of a first predetermined overload current and means for reclosing said switch means after an opening operation thereof, time delay means associated with said switch closing means and including timing circuit means for delaying the closing of said main switch means, operation counting means coupled to said switch operating means and actuable by the operation thereof, and second overload responsive means coupled to said system and to said timing circuit means operable to modify the time delay thereof upon the occurrence of a second overload current having at least a predetermined greater value than said first predetermined overload current so that the closing time delay of said switch means will be modified.

18. A repeating circuit interrupter including main switch means in circuit with an electrical system, circuit means coupled to said system for providing an electrical signal functionally related to the magnitude of the current in said system, switch opening means operable to open said switch means, first level detecting means coupled to said circuit means for actuating said switch opening means when said electrical signal equals a first predetermined value, switch closing means operable to close said switch means after an opening operation thereof, time delay means associated with said switch closing means including timing circuit means coupled to said switch closing means for delaying the closing of said main switch means, and second level detecting means coupled to said circuit and to said timing circuit means and operable to modify the time delay thereof upon the occurrence of an electrical signal having a predetermined greater value than said first predetermined electrical signal.

19. The repeating circuit interrupter set forth in claim 18 wherein said closing time delay means includes a plurality of closing time delay circuits and sequencing means having a plurality of stages and being operable to successive ones of said stages upon each switch opening operation, one of said closing time delay circuit means being associated with each of said stages, the operation of said sequencing means from an initial stage to each of a predetermined number of successive stages being operable to actuate said switch closing means through said closing time delay means, the operation of said sequencing means to the next succeeding stage after said predetermined number being ineffective to actuate said switch closing means so that said switch means is not reclosed, and third level detecting means coupled to said circuit means and operable upon the occurence of an electrical signal having a predetermined greater value than said first predetermined electrical signal to render said switch closing means ineffective upon the operation of said sequencing means to a predetermined one of said successive stages.

20. The repeating circuit interrupter set forth in claim 19 and including resetting means coupled to said system and upon the return of normal circuit conditions to effect the return of said sequencing means so that the first of said successive stages when the number of opening operations is less than a predetermined number, time delay means associated with said resetting means for delaying the operation thereof after the return of normal circuit conditions to said circuit, and fourth level detecting means coupled to said circuit means and responsive to an electrical signal having a predetermined greater value than said first predetermined electrical signal and operative to modify said resetting time delay means so that the time of said resetting means has a predetermined different value.

21. The repeating circuit interrupter set forth in claim 19 and including opening time delay means operable to delay the opening of said main switch means, said sequencing means being operable after a predetermined number of switch opening operations to modify the time delay of said opening time delay means, and fourth level detecting means operable to render said opening time delay means ineffective upon the occurence of an electrical signal having a predetermined greater value than said first predetermined value so that said repeating circuit interrupter opens substantially instantaneously.

22. The repeating circuit interrupter set forth in claim 18 wherein said timing circuit means comprises an RC circuit coupled to said switch closing means and, wherein said first level detecting means is operative to modify the time constant of said RC time delay circuit upon the occurrence of said predetermined electrical signal.

23. Control means for a repeating circuit interrupter having main switch means in circuit with an electrical system, circuit means coupled to said system for providing an electrical signal functionally related to the magnitude of the current in said system, switch opening means, switch reclosing means operable after a switch opening operation, and first level detecting means coupled to said circuit for initiating a switch opening operation when the current in said system equals the first predetermined quantity, said control means including switch opening and switch closing time delay means operable to respectively delay the opening and reclosing of said main switch means, sequencing means operable to prevent the reclosure of said main switch means after a predetermined number of opening operations, reset means for resetting said sequencing means if the number of opening operations is less than said predetermined number and second level detecting means coupled to said circuit and operable to modify the operation of said control means when the current in said system equals the second predetermined quantity which is greater than said first predetermined quantity to modify one of said opening and closing time delay means.

24. The control means set forth in claim 23 wherein said second level detecting means is coupled to said opening time delay means and is constructed and arranged to render said opening time delay means inoperative so that said switch means opens relatively instantaneously upon the occurrence of said second predetermined current in said system.

25. The control means set forth in claim 23 wherein said second level detecting means is coupled to said reclosing time delay means and is constructed and arranged to modify said reclosing time delay means so that the reclosing time delay is modified when the current in said system equals the second predetermined quantity.

26. The control means set forth in claim 23 wherein said second level detecting means includes a first static circuit element having a control electrode connected to said circuit and an output electrode, a second switching element having an output electrode and a control electrode connected to the output electrode of said first circuit element, and a third circuit element having a control part connected to the output electrode of said second circuit element and an output part connected to said control means, said first static circuit element being operable to render said second switching element conductive upon the occurrence of an electrical signal having a predetermined value, said third circuit element being operable to modify the operation of said control means when said circuit element is rendered conductive.

27. The repeating circuit interrupter set forth in claim 12 wherein said time delay means comprises energy storage means, said first level detecting means comprising first switching circuit means for normally preventing said energy storage means from charging, said first level detecting means being rendered ineffective to prevent charging of said energy storage means when said signal equals a predetermined value, said switch opening means being coupled to said energy storage means for opening said main switch means when a predetermined quantity of energy is stored therein, said second level detecting means comprising second switching circuit means operative to render said time delay means ineffective to delay the operation of said switch opening means.

28. The repeating circuit interrupter set forth in claim 27 wherein said energy storage means comprises RC time delay circuit means, said first and second switching circuit means comprising static switching means.

29. The repeating circuit interrupter set forth in claim 22 wherein said second level detecting means comprises static switching circuit means operable when said signal reaches a predetermined value.

References Cited

UNITED STATES PATENTS

| | | | |
|---|---|---|---|
| 2,264,823 | 12/1941 | Anderson | 317—22 |
| 2,264,280 | 12/1941 | Groce et al. | 317—22 |
| 2,439,920 | 4/1948 | Brown | 317—22 |
| 2,648,803 | 8/1953 | Wood | 317—22 |
| 2,871,415 | 1/1959 | Chabala | 317—22 |
| 2,892,127 | 6/1959 | Leonard | 317—22 |
| 2,994,805 | 8/1961 | Nash | 317—22 |
| 3,100,854 | 8/1963 | Riebs | 317—22 |
| 3,105,920 | 10/1963 | Dewey | 317—22 |
| 3,155,870 | 11/1964 | Casey et al. | 317—22 |

LEE T. HIX, *Primary Examiner.*

R. V. LUPO, *Assistant Examiner.*